United States Patent
Kramer

[11] Patent Number: 5,829,933
[45] Date of Patent: Nov. 3, 1998

[54] WASHER WITH A RELIEF

[76] Inventor: Frederic P. Kramer, P.O. Box 7640, Beverly Hills, Calif. 90212

[21] Appl. No.: 979,918

[22] Filed: Dec. 2, 1997

[51] Int. Cl.$^6$ .............................. F16B 39/24; F16B 43/02
[52] U.S. Cl. ............................ 411/156; 411/161; 411/544
[58] Field of Search ..................... 411/149, 155, 411/156, 160, 161, 162, 533, 544, 368

[56] References Cited

U.S. PATENT DOCUMENTS

| | | | |
|---|---|---|---|
| 212,549 | 2/1879 | Gear | 411/533 |
| 405,632 | 6/1889 | Warren . | |
| 621,456 | 3/1899 | Jamieson . | |
| 968,991 | 8/1910 | Shafer . | |
| 1,143,091 | 6/1915 | Stimpson . | |
| 1,208,620 | 12/1916 | Moser . | |
| 1,598,165 | 8/1926 | Stevenson . | |
| 1,896,650 | 2/1933 | Trotter . | |
| 2,369,865 | 2/1945 | Spencer . | |
| 2,779,376 | 1/1957 | Poupitch | 411/149 X |
| 3,009,176 | 11/1961 | Knocke | 411/533 X |
| 3,077,218 | 2/1963 | Ziegler | 411/155 |
| 3,476,009 | 11/1969 | Markey . | |
| 3,948,141 | 4/1976 | Shinjo . | |
| 4,347,024 | 8/1982 | Coldren . | |
| 4,450,616 | 5/1984 | Morita . | |
| 4,808,050 | 2/1989 | Landt . | |
| 4,971,498 | 11/1990 | Goforthe . | |
| 5,547,326 | 8/1996 | Overhues | 411/156 X |

*Primary Examiner*—Neill Wilson

[57] ABSTRACT

A Belleville spring washer (15) having an annular relief (25) depending from in its top surface (24). The relief (25) is disposed adjacent the circumferential wall (27) forming a centrally disposed opening (18) for the washer (15), the circumferential wall (27) not physically engaging the shank (37) of a fastener (39) when mounted and torqued thereon. The washer (15) includes a series of radially-extending serrations (23), each beginning adjacent the relief (25) and extending outwardly through the span (21) of the annular body (17) forming washer (15). In its mounting to a fastener (39) to be applied to a bearing surface (45), the serrations (23) face the undersurface (40) of the fastener's head (42), and the head (42) is torqued to a proper setting. The serrations (23) efficaciously bite into the head's undersurface (40), providing a tight engagement of fastener (39) to the bearing surface (45), and one which eliminates looseness in the fastener (39) upon a thermal expansion of the metal of the elements.

4 Claims, 2 Drawing Sheets

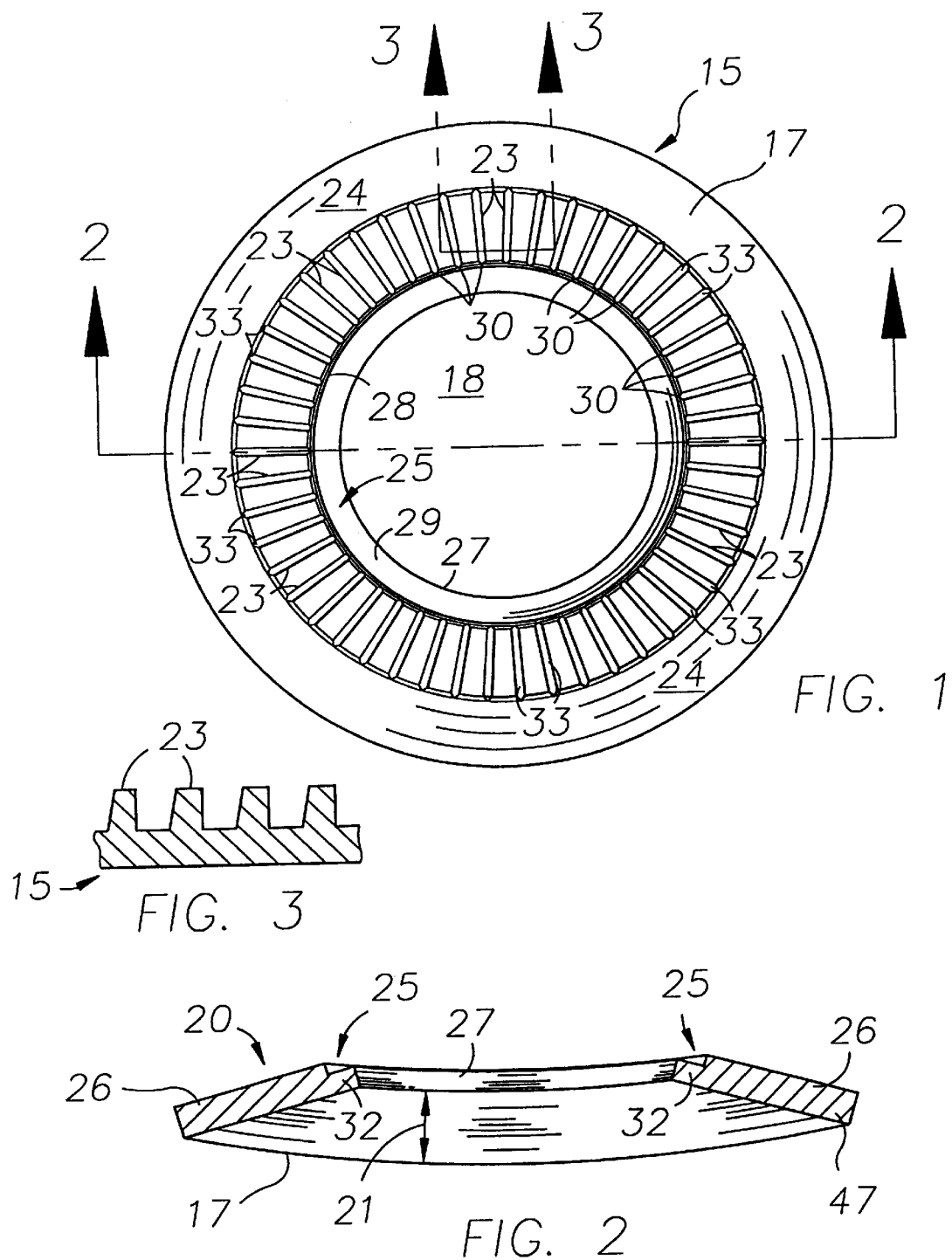

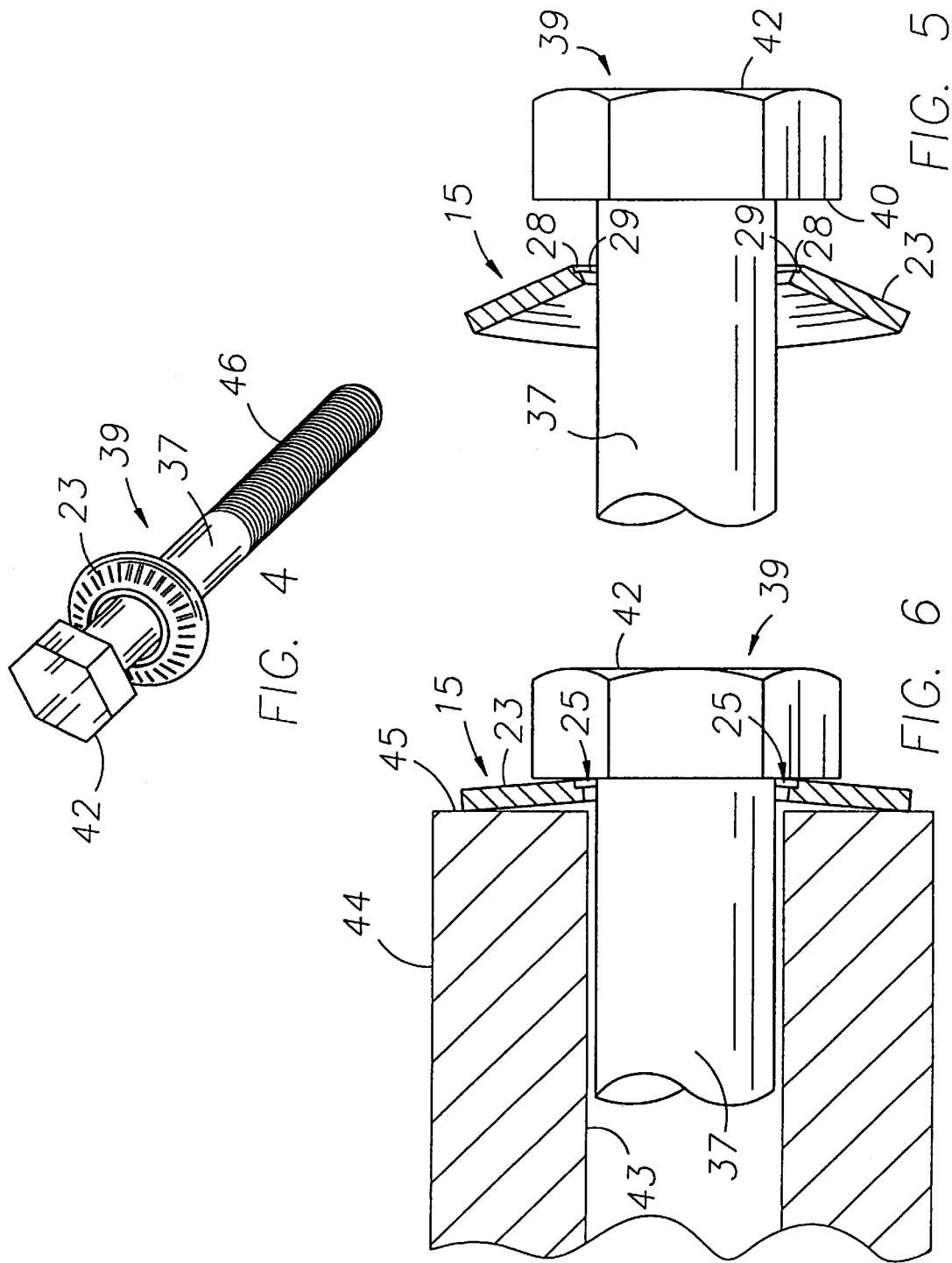

5,829,933

WASHER WITH A RELIEF

This invention is directed to washers having a spring characteristic to them, to be utilized with fasteners and nuts upon a bearing surface, and in particular to a washer with a relief the result of which providing a tighter fastening of a bolt or nut to the bearing surface.

TECHNICAL FIELD

In applications requiring heavy bolted sections, or in bus-bar applications, washers having a spring characteristic are known and have been used. One type in the art, long well-known and used, is a "Belleville spring" washer. However, due to thermal expansion of bolts in various engineering applications, a looseness is generated in the bolted sections. Statistics, in terms of a bolt clamping force vs. a tightening torque for bolts, have been generated to assist in knowing just what "Belleville spring" washer is best for the load (and its nature, such as electrical, for example) under consideration. Nevertheless, looseness has been found to creep into the bolted section when not desired.

This invention provides for a tight non-loosening connection of a bolt or nut to a bearing surface, eliminating undesired looseness in application.

Prior art disclosures of washers and Belleville springs are found in the following teachings: U.S. Pat. Nos. 405,632; 671,456; 968,991; 1,143,091; 1,208,620; 1,598,165; 1,896,650; 2,369,865; 3,476,009; 3,948,141; 4,347,024; 4,450,616; 4,808,050; 4,971,498.

SUMMARY OF THE INVENTION

The invention lies in a washer having a Belleville spring characteristic within its geometrical configuration and a series of radially extending serrations formed within the annular or radial body forming the washer. The inventive concept is directed to the combination of the serrations and a relief provided in the washer's top surface adjacent its centrally disposed opening. The inwardly disposed ends of the serrations terminate adjacent the top edge of the relief and extend radially outwardly, sufficiently long to extend beyond the diametrical extremity of the head of the fastener to which it is to be mounted. As a fastener is torqued to, or as a nut is tightened down on, a bearing surface, the inventive washer being in abutment to the fastener's head or to the nut, as the washer is being squashed in the tightening of fastener or nut to the bearing surface, a tight engagement between head and washer or nut and washer results. The result is a more positive hold of fastener or nut with the washer to a bearing surface, never achieved before with this type of washer. Looseness is virtually eliminated in various engineering applications, one example being in the case of a thermal expansion of the metals of fastener, washer and bearing surface body formation.

An object of this invention is to provide a novel Belleville spring washer.

Another object of this invention is to eliminate looseness in the tightened arrangement of fastener and bearing surface.

A further object of this invention is to provide an efficacious bite between a fastener's head or a nut and their corresponding Belleville spring washer.

These and other objects and advantages of the invention will become more apparent by a full and complete reading of the following description, the claims appended thereto, and the accompanying drawing comprising two (2) sheets of six (6) FIGURES.

BRIEF DESCRIPTION OF THE DRAWING

FIG. 1 is a plan view of a washer that is the subject matter of this invention.

FIG. 2 is a fragmentary view, somewhat in perspective from under the washer, taken on line 2—2 of FIG. 1.

FIG. 3 is a view taken on line 3—3 of FIG. 1.

FIG. 4 is a perspective view of a mounting of the inventive washer to a fastener the example here being a bolt.

FIG. 5 is an enlarged fragmentary elevational view, partly in cross-section, of a fastener and the inventive washer initially mounted thereto.

FIG. 6 is an enlarged fragmentary elevational view, partly in cross-section, of the fastener and inventive washer of FIG. 5 in a properly or correctly torqued condition to a bearing surface.

DESCRIPTION OF THE BEST MODE OF CARRYING OUT THE INVENTION

Referring now to the drawing in which reference characters therein correspond to like numerals hereinafter, a washer 15 of the inventive concept is illustrated in the views of FIGS. 1–3. Washer 15 is of the Belleville spring type comprising an annular body 17 about a centrally located or disposed opening 18 and having a Belleville configuration 20, FIG. 2, throughout the entire span 21 of body 17. The configuration 20 of washer 15 is illustrated in FIG. 2 it being taken across a full diameter of the washer, and includes a concaved aspect to it, as is known for Belleville type washers.

In addition to such configuration 20, a series or plurality of radially extending serrations 23, FIGS. 1, 3, are formed in the top surface 24 of the annular body 17. Serrations 23 are spaced from one another, and disposed in a circumferential manner around the annular body 17, the number thereof in each washer 15 being determined by the size of the washer, their lengths not necessarily extending to the peripheral edge of the washer but may terminate in a peripheral ring-like manner within the span 21, FIG. 2, of annular body 17 itself, and as illustrated in the drawing FIGURES. The serrations 23 are uniform in their make-up and thereby formed during the formation of the washer 15 itself. It should be understood that serrations 23 of this nature have been known prior to this invention, but on the other hand, this invention utilizes such features in achieving the object of non-looseness in the tightened arrangement of fastener or nut to a bearing surface.

An annular relief 25 is formed in the top surface 24 of an upper portion 26 of annular body 17, FIG. 2, extending circumferentially about a circumferential wall 27 forming opening 18. Relief 25 comprises a configuration of a first wall 28, FIGS. 1 and 5, extending directly down into the upper portion 26 of annular body 17 and a second wall 29 extending at an angle from the first wall 28 to circumferential wall 27.

Inner ends 30, FIG. 1, of the serrations 23 are disposed proximate to the first wall 28, outside of the marginal portion 32, FIG. 2, of the annular body 17 out of which relief 25 is formed. Outer ends 33 of serrations 23 are disposed usually uniformly at a geometrically curved endless line (not shown) within the span 21 of annular body 17. It should be understood that depending upon the size of washer 15, which in turn depends on types and sizes of fasteners, some examples of which being socket-and-cap screw, standard hex bolt, and wide bolthead type, the lengths of the serrations will vary; nevertheless, the heads of the fasteners extend over the lengths of the serrations either to their full lengths or over a goodly portion of their lengths, in order that the invention is operative.

In operation, washer 15 is mounted to the shank 37 of a fastener, such as a threaded bolt 39, FIG. 4, with serrations 23 facing the undersurface 40, FIGS. 5, 6, of a head 42 formed on the fastener. Fastener 39 then is inserted into a bore 43, say, of a flange 44 having a bearing surface 45, a threaded portion 46 on the fastener, FIG. 4, preparing to mate with corresponding threads (not shown) formed in the body formation for bore 43. Head 42 is rotated, say, manually, or by means of a wrench (not shown). As fastener 39 and washer 15 approach a tightened effect upon the bearing surface 45, it then is torqued by the wrench to a proper or correct setting. Washer 15 assumes a condition approaching a flattened state, however, it is known that Belleville washers do not completely flatten upon a correct or proper torque setting. However, with or without a truly non-flattened condition, a tight efficacious bite of washer 15 to the underside of head 42, one never realized before in the use of a Belleville spring-type washer, is achieved by reason of the incorporation of annular relief 25. It should be noted that the circumferential wall 27 of opening 18 of washer 15 does not frictionally engage the shank 37 of the fastener as torquing is concluded; the opening was freely spinnable about the shank before torquing fastener (or nut) to bearing surface and although no longer spinnable in the tightened mode it remains free of the shank. In the event of a thermal expansion of the metals of the elements here—that of the flange, fastener (nut), and/or washer—and which in the past has shown that looseness is generated in the tightened mode for a Belleville spring washer—such looseness is eliminated with the application of washer 15, irrespective of any engineering or other theory supporting or negating the efficacious advantage of non-looseness in the application of washer 15.

It should be understood that in the deformation of the annular body of the inventive washer 15, in both its upper portion 26 and lower portion 47, FIG. 2, and which occurs during the squashing that takes place on washer 15 in the torquing of fastener 39 and washer 15 to the bearing surface 45, lower portion 47 of the circumferential wall 27, below the relief 25, and which includes the marginal portion 32 of the annular body 17, does not physical engage shank 37 of fastener 39.

In the formation or making of the washer 15, a spring steel member or strip of such material of a given width and thickness, depending upon the size of the washer 15 to be produced, is fed through a progressive die. The inner diameter [I.D.] forming the washer's opening 18 is punched out of the material. The die is piloted for alignment required in the next step. The die then impresses spaced serrations 23 upon the top surface 24 of the washer 15. The die is piloted on the I.D., after which it cuts the outer diameter [O.D.] and forms the height or concaved configuration for the washer 15. Thereafter, washer 15 is heat-treated to the standard RC 42-50.

A range between low and high carbon steel material is utilized in the making of the washer 15, depending upon a particular application to which the washer 15 is to be put, usually already ascertained by the manufacturer or another ordering the washer 15.

The invention is not to be limited to the exact illustrations shown in the accompanying drawing or described in this specification, as various changes and modifications, not limited to those outlined above, in the details of construction of the washer 15 may be resorted to without departing from the spirit and scope of the invention. Therefore, only insofar as the invention has particularly been pointed out in the accompanying claims is the same to be limited.

Industrial Applicability

The invention is utilized in a variety of engineering and applied environments, such as, for example, in power generators, turbines, petrochemical pumps and valves, sonar detection systems, pipe support systems, automatic actuators, in electrical industry applications, and in automotive and farm implements.

I claim:

1. An improvement in a Belleville-type washer having an annular body including an upper portion having a top surface and a circumferential wall forming a centrally disposed opening for the washer, and serrations circumferentially mounted upon the top surface of the annular body, the improvement comprising a relief formed in the upper portion of the annular body adjacent its circumferential wall, the relief in its formation having a limited depth extending from the top surface and which does not cause the circumferential wall to frictionally engage the shank of a fastener to which the washer is to be torqued, the relief including an angle in its formation.

2. In the improvement of claim 1, the washer being heat-treated.

3. In the improvement of claim 1, the relief comprising a first wall depending from the top surface into the annular body of the washer, and a second wall extending from the first wall to the circumferential wall.

4. In the improvement of claim 3, the washer being heat-treated.

* * * * *